(12) United States Patent
Li et al.

(10) Patent No.: US 8,995,328 B2
(45) Date of Patent: Mar. 31, 2015

(54) MULTICAST SERVICE

(75) Inventors: Zhenhong Li, Shanghai (CN); Wei Zou, Shanghai (CN); Haifeng Wang, Shanghai (CN); Gang Wu, Shanghai (CN)

(73) Assignee: Nokia Corporation, Espoo (FI)

( * ) Notice: Subject to any disclaimer, the term of this patent is extended or adjusted under 35 U.S.C. 154(b) by 28 days.

(21) Appl. No.: 13/521,809

(22) PCT Filed: Jan. 13, 2011

(86) PCT No.: PCT/FI2011/050021
§ 371 (c)(1),
(2), (4) Date: Jul. 12, 2012

(87) PCT Pub. No.: WO2011/086236
PCT Pub. Date: Jul. 21, 2011

(65) Prior Publication Data
US 2012/0294223 A1 Nov. 22, 2012

(30) Foreign Application Priority Data
Jan. 15, 2010 (GB) .................................. 1000691.4

(51) Int. Cl.
| | | |
|---|---|---|
| H04H 20/71 | (2008.01) | |
| H04L 12/18 | (2006.01) | |
| H04B 7/00 | (2006.01) | |
| H04W 4/00 | (2009.01) | |
| G06F 15/16 | (2006.01) | |

(52) U.S. Cl.
CPC ........... *H04L 12/1868* (2013.01); *H04L 12/189* (2013.01)

USPC ........... 370/312; 370/310; 370/328; 370/329; 709/232

(58) Field of Classification Search
USPC ...................... 370/328, 310, 312, 329; 714/52
See application file for complete search history.

(56) References Cited

U.S. PATENT DOCUMENTS

| | | | |
|---|---|---|---|
| 6,505,253 B1 | 1/2003 | Chiu et al. | |
| 8,295,220 B2 | 10/2012 | Zou et al. | |
| 8,351,364 B2 * | 1/2013 | Ihm et al. | 370/312 |

(Continued)

FOREIGN PATENT DOCUMENTS

| | | |
|---|---|---|
| JP | 2007-266876 A | 10/2007 |
| WO | 2005/018144 A1 | 2/2005 |

(Continued)

OTHER PUBLICATIONS

Fitzek et al., "Cellular Controlled Short-Range Communication for Cooperative P2P Networking", An International Journal on Wireless Personal Communications, vol. 48, Issue 1, Jan. 2009, pp. 1-5.

(Continued)

*Primary Examiner* — Helal A Algahaim
*Assistant Examiner* — Mahmoud Ismail
(74) *Attorney, Agent, or Firm* — Mintz Levin Cohn Ferris Glovsky and Popeo, P.C.

(57) ABSTRACT

A method including sending a multicast packet to a cluster of recipients; receiving information indicating receiving status relating to the multicast packet from individual members of the cluster of recipients; and initiating intracluster retransmission of said multicast packet by sending to the cluster of recipients collective information about the receiving statuses of the members of the cluster of recipients.

15 Claims, 5 Drawing Sheets

(56) References Cited

U.S. PATENT DOCUMENTS

| | | | |
|---|---|---|---|
| 2003/0152041 A1* | 8/2003 | Herrmann et al. | 370/310 |
| 2005/0034033 A1* | 2/2005 | Nemawarkar et al. | 714/52 |
| 2006/0291410 A1* | 12/2006 | Herrmann | 370/328 |
| 2007/0286121 A1 | 12/2007 | Kolakowski et al. | |
| 2010/0027487 A1* | 2/2010 | Ihm et al. | 370/329 |

FOREIGN PATENT DOCUMENTS

| | | | |
|---|---|---|---|
| WO | 2008/123662 A1 | 10/2008 | |
| WO | WO 2008123662 A1 * | 10/2008 | |
| WO | 2009/157902 A1 | 12/2009 | |

OTHER PUBLICATIONS

Sinkar et al., "Cooperative Recovery in Heterogeneous Mobile Networks", 5th Annual IEEE Communications Society Conference on Sensor, Mesh and Ad Hoc Communications and Networks, Jun. 16-20, 2008, pp. 395-403.

"3rd Generation Partnership Project; Technical Specification Group Radio Access Network; Evolved Universal Terrestrial Radio Access (E-UTRA); Multiplexing and Channel Coding (Release 8)", 3GPP TS 36.212, V8.7.0, May 2009, pp. 1-60.

"3rd Generation Partnership Project; Technical Specification Group Radio Access Network; Evolved Universal Terrestrial Radio Access (E-UTRA); Physical Channels and Modulation (Release 8)", 3GPP TS 36.211, V8.7.0, May 2009, pp. 1-83.

Zhang et al., "Design and Performance Evaluation of Cooperative Retransmission Scheme for Reliable Multicast Services in Cellular Controlled P2P Networks", The 18th Annual IEEE International Symposium on Personal, Indoor and Mobile Radio Communications, Sep. 3-7, 2007, 5 pages.

International Search Report and Written Opinion received for corresponding International Patent Application No. PCT/FI2011/050021, dated Apr. 20, 2011, 11 pages.

Search Report received for corresponding United Kingdom Patent Application No. 1000691.4, dated Apr. 22, 2010, 3 pages.

* cited by examiner

MULTICAST SERVICE

RELATED APPLICATION

This application was originally filed as PCT Application No. PCT/FI2011/050021 filed Jan. 13, 2011, which claims priority benefit to United Kingdom Patent Application No. 1000691.4, filed Jan. 15, 2010.

TECHNICAL FIELD

The present invention generally relates to wireless communications and multicast service in wireless communication networks.

BACKGROUND ART

Multicasting is a network technology for delivering information to a group of recipients simultaneously. Multicasting can be referred to as point-to-multipoint data transmission as well.

Multicast services are becoming more and more popular with the development of cellular wireless networks. For example in LTE (Long Term Evolution) networks data can be transmitted to multiple recipients by eNB (evolved Node B). By utilizing the shared nature of wireless medium, multicast service can be realized with a high efficiency.

HARQ (hybrid ARQ, Automatic Repeat reQuest) protocol can be incorporated into the packet multicasting process in order to support reliable packet delivery in a multicast service. In that case, each user in the group of recipients will feedback an ACK/NACK message for the multicast packets, and a packet will be retransmitted, if a NACK message for it is reported by one of the members of the group of recipients.

US2006/0291410 discloses a solution for multicast retransmissions. If one recipient sends a negative acknowledgement, the other recipients are informed that it is no longer necessary to provide feedback, since retransmission will be initiated anyway.

Also a scenario in which members of a group of recipients of a multicast transmission take care of the retransmissions has been proposed. That is, a recipient that successfully received a packet retransmits the packet to recipients that didn't receive the packet or received it with errors. For example "Cellular controlled short-range communication for cooperative P2P networking," F. H. P. Fitzek, M. Katz, and Q. Zhang, Proc. Wireless World Research Forum, Heidelberg, 2006 discloses one such solution.

SUMMARY

According to a first aspect the present invention comprises a method which comprises obtaining information defining acknowledgement feedback resources for a cluster, receiving a multicasted packet from a multicast transmitter, determining reception status for the packet, responsive to the reception status being positive, transmitting in a positive acknowledgement phase of the cluster a positive acknowledgement to the multicast transmitter and obtaining negative acknowledgements directly from cluster members in a negative acknowledgement phase of the cluster, responsive to the reception status being negative, transmitting in a negative acknowledgement phase of the cluster a negative acknowledgement to the multicast transmitter and obtaining positive acknowledgements directly from cluster members in a positive acknowledgement phase of the cluster, and participating in intra-cluster retransmission concerning the received packet based on obtained acknowledgement information.

According to a second aspect the present invention comprises an apparatus comprising at least one processor and at least one memory including computer program code, the at least one memory and the computer program code configured to, with the at least one processor, cause the apparatus to perform at least the following actions: obtain information defining acknowledgement feedback resources for a cluster, receive a multicasted packet from a multicast transmitter, determine reception status for the packet, responsive to the reception status being positive, transmit in a positive acknowledgement phase of the cluster a positive acknowledgement to the multicast transmitter and obtain negative acknowledgements directly from cluster members in a negative acknowledgement phase of the cluster, responsive to the reception status being negative, transmit in a negative acknowledgement phase of the cluster a negative acknowledgement to the multicast transmitter and obtain positive acknowledgements directly from cluster members in a positive acknowledgement phase of the cluster; and participate in intra-cluster retransmission concerning the received packet based on obtained acknowledgement information.

BRIEF DESCRIPTION OF THE DRAWINGS

The invention will be described, by way of example only, with reference to the accompanying drawings, in which.

DETAILED DESCRIPTION

It is observed that in a multicast service, after a first round of multicast from a multicast transmitter, different recipients of the multicast packets may have different receiving status. For example, a service packet may be received correctly at one recipient but incorrectly at another recipient. When the recipients are located physically near each other, performing retransmission between the recipients can result in higher spectrum efficiency than performing retransmission by the original multicast transmitter. The reason for this is that due to the recipients being physically close to each other data transfer links between them are likely to be better than multicast cellular links. Thus it may be desirable to perform intra-cluster retransmissions between members of a cluster of recipients of a multicast transmission.

Figure 1A:
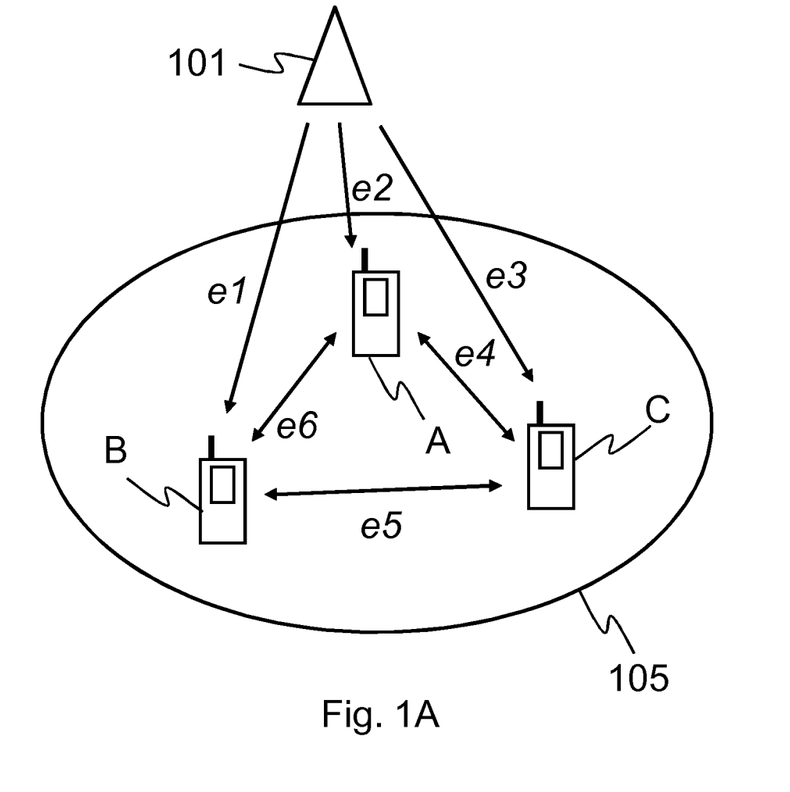
FIG. 1A shows an example multicast scenario.

FIG. 1A shows an example multicast scenario in which certain embodiments of the invention can be applied. In the shown scenario, recipients of a multicast service can form a cluster in order to help each other in receiving multicast service data. The scenario comprises a multicast transmitter 101, such as eNB of a long term evolution, LTE, communication system and three recipients A, B and C, the recipients forming a cluster of recipients 105. The multicast transmitter sends multicast packets and the recipients in the cluster 105 first receive multicast packets from the multicast transmitter, and then help each other to correctly receive the multicast packets, if some of them cannot decode the multicast packets correctly, did not receive the multicast packets, or received them with errors.

Notation e1-e6 in FIG. 1A refers to quality of transmission links between the multicast transmitter and the recipients or between the recipients. The quality values may be for example channel quality indicator, CQI, values defined for LTE. They may also be other quality values, for example pathloss or attenuation estimates. These will be discussed in more detail below.

In the scenario of FIG. 1A, the multicast transmitter 101 controls the retransmissions that occur between the members of the cluster 105. There are at least two options for implementing the retransmission control. One option is a distributed local control, where the multicast transmitter only allocates a large resource block to the whole multicast cluster, and a recipient operating as a cluster head will be responsible for deciding, which retransmissions need to be performed, and for notifying other members of the cluster about details of the retransmissions. Another option is a centralized control, where the multicast transmitter controls each intra-cluster retransmission directly. In this option, the multicast transmitter needs to notify all the cluster members of detailed retransmission information, including occupied radio resource, modulation and coding profile, transmission power, etc.

In the centralized control method, the transmitter needs to notify the members of the cluster of all details of the retransmissions. These notifications may be considered a kind of broadcasting signaling, and therefore it may be desirable to efficiently deliver them to the recipients (the members of the cluster).

In LTE-A (LTE Advanced), multicast transmission details are notified in a downlink control information, DCI, block broadcasted in physical downlink control channel, PDCCH, as defined in 3GPP TS 36.212 V8.7.0 (2009-05). For example, to specify a retransmission in physical uplink shared channel, PUSCH, a "Format 0" DCI block should be broadcasted. In this example, quadrature phase-shift keying, QPSK, modulation is used in PDCCH so that essential control information can be received reliably at all user equipments, UEs, as defined in 3GPP TS 36.211 V8.7.0 (2009-05). Hence, the contents of information elements in PDCCH should be carefully designed in order to minimize signaling overhead caused by control information.

If each intra-cluster multicast retransmission is specified in the same way as a conventional transmission block, i.e. if details of each retransmission are notified by DCI block broadcasted in PDCCH, a large signaling overhead is caused in PDCCH. Although synchronous hybrid automatic repeat request, HARQ, and persistent scheduling may be applied to reduce signaling overhead, persistent scheduling may reduce spectrum efficiency because sometimes the retransmission might, using non-persistent scheduling, use a more efficient higher-order modulation compared as with the first multicasting round.

Now, a semi-centralized control for intra-cluster retransmission is proposed. In order to reduce the signaling overhead in control channels, the multicast transmitter 101 does not fully control the retransmissions, but only allocates an overall resource block for performing the retransmissions and allows the recipients to decide details of the retransmissions. The recipients exchange among themselves positive and/or negative acknowledgements to determine which recipients received the multicast transmission correctly and which ones did not. In this way only information about the allocated resource block and the collective information about receiving statuses is distributed among the recipients. The members of the cluster may then decide upon their retransmission and receiving actions within the allocated resource block.

In an embodiment a multicast transmitter allocates an overall resource block for multiple retransmissions and each member of a cluster of recipients decides how to perform the retransmission within the allocated overall resource block in a distributed mode. I.e. each member of a cluster of recipients individually decides when to transmit, what to transmit, when to receive, and optionally also in which modulation and coding scheme transmissions are done. The resource block may be defined in terms of frequency, time and/or spreading codes used, for example. The block may in some embodiments be a sub-block of resources in use by the multicast transmitter 101, and in other embodiments it may be an unlicensed block, for example a block compatible with use using the Bluetooth technology, or some other short range communication technology.

In an embodiment members of a cluster or recipients exchange information about receiving statuses of the members of the cluster of recipients, which forms collective information. A receiving status can be an acknowledgement, ACK, confirming successful receipt of the concerned multicast packet or a non-acknowledgement, NACK, informing that the concerned multicast packet was not received or was received with errors. The collective information can include ACK/NACK statuses for multiple multicast packets, for example for a group of packets or a block of data. In an example embodiment, the ACK/NACK table is a matrix $\{a_{ij}\}$ where element $a_{ij}$ refers to the receiving status ('0' or '1') of jth packet at ith node in the cluster of recipients. In an example, ACK is represented by '0' and NACK is represented by '1'. Also the opposite notation can be used.

In an embodiment the collective information about the receiving statuses is sent for a plurality of multicast packets at the same time. The number of packets in such a batch can be fixed or it can be decided dynamically, for example on the basis of available buffer capacity. In this example, a retransmission batch might comprise a smaller number of larger packets or a larger number of smaller packets, so that buffer capacity is not exhausted.

In an embodiment a member of a cluster of recipients determines and performs retransmission actions at least partly on the basis of the collective information about the receiving statuses exchanged within the cluster.

In an embodiment the retransmission actions comprise retransmitting a received multicast packet to at least one other member of the cluster of recipients of the multicast transmission. Additionally or alternatively the retransmission actions may comprise re-receiving a received multicast packet from another member of the cluster of recipients of the multicast transmission. In an embodiment determining the retransmission actions comprises deciding upon transmission and/or reception actions and/or duration within a resource block allocated for the retransmissions.

In certain embodiments one or more of the following are taken into account when determining retransmission actions: link strengths or link quality of communication links between members of the cluster of recipients, a resource block allocated for the retransmissions, retransmission priorities defined for the members of the cluster of recipients, size of the packet to be retransmitted, and power conditions of the members of the cluster. Power conditions may comprise available battery capacity and/or available connection to a continuous power source such as a power socket.

In an embodiment retransmission actions are determined so that retransmissions take place over the best quality links that are available. In an example, potential candidates for performing retransmissions are first selected on the basis of the receiving statuses of the members of the cluster of recipients. That is, the recipients that correctly received a certain packet are potential candidates for retransmitting that certain packet. Then strength or quality of links associated with potential retransmission paths are considered and the best quality links are selected.

In some embodiments, cluster members send probing messages to each other to determine strengths of links interconnecting them. Actual past retransmissions may also or alternatively be used to probe link strengths. In cases where at least some of the cluster members are mobile, link strengths may vary in time, wherefore historical information is in some embodiments used in a weighted manner so that more recent information is weighted more than older information. Acknowledgement messages may also be used as probing messages to determine strengths of links interconnecting cluster members. Probing messages, for example acknowledgements or negative acknowledgements, may comprise indications on the power levels at which they were transmitted, which may be used when determining attenuation.

It may happen that two or more potential retransmission paths are considered equally good. In such case, retransmission priorities defined for the members of the cluster of recipients may be considered in order to be able to select the member that is to perform the retransmission.

In some embodiments, cluster members with good power conditions (e.g. good battery status) are preferentially selected as retransmitters. Information about power conditions or battery statuses may be exchanged between the cluster members in link strength probing messages, for example acknowledgements, or retransmissions. In embodiments where at least one cluster member is connected to a stable power supply, for example when a mobile cluster member is connected to a charger, this cluster member may be selected as a preferred retransmitter. Information on access to a stable power supply may also be exchanged in probing messages between the cluster members.

In an embodiment the members of the cluster of recipients use the same criteria for determining the retransmission actions whereby they end up to the same conclusion. In an embodiment the same criteria are known in the multicast transmitter as well and are used in the multicast transmitter for determining a size of an overall resource block needed for the retransmissions.

In the following, various example embodiments are disclosed with reference to LTE technology, but similar procedures may be applied in other technologies as well.

Figure 1B:
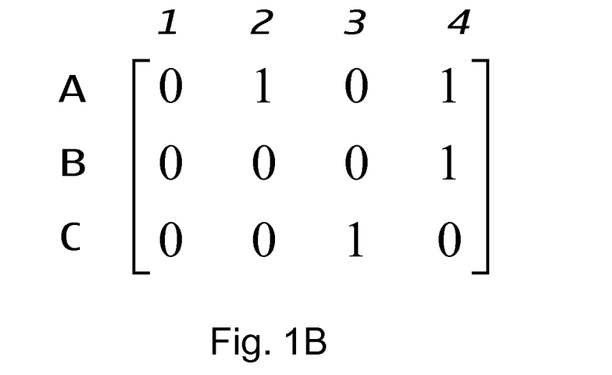
FIG. 1B shows an ACK/NACK table according to an embodiment.

FIG. 1B shows an ACK/NACK table according to an embodiment. Let's consider for example the three recipients A, B and C, or A-C, in FIG. 1A. The multicast transmitter sends four multicast packets and collects receiving statuses from the recipients A-C. The receiving statuses are collected into the 3×4 table shown in FIG. 1B. In the table ACK is represented by '0' and NACK is represented by '1'. Rows A-C refer to different recipients and columns 1, 2, 3 and 4, or 1-4, refer to different multicast packets.

From the table it can be seen that packet 1 has been correctly received by all recipients. For packet 2, recipient A needs retransmission and recipients B and C can be candidate senders. For packet 3, recipient A needs retransmission and recipients A and B can be candidate senders. For packet 4, recipients A and B need retransmission and recipient C is the only candidate sender.

In an embodiment the recipient that retransmits a certain packet is selected on the basis of strength or quality of the links between the recipients. Additionally or alternatively the selection may be based on retransmission priority notified by the original multicast transmitter.

Considering the example scenario of FIG. 1A and the ACK/NACK table of FIG. 1B and given, for example, that e4=4, e5=1 and e6=2 (e4, e5 and e6 are CQI values as shown in FIG. 1A), recipient C will be the best sender for packet 2 because e4>e6, if the selection criteria is link quality. Similarly, recipient A will be the best sender for packet 3, and C will be the best sender for packet 4. Here, it is assumed that channel quality indicator, CQI, values between eNB and the served UEs and the CQI values between UEs in the cluster are available.

If the retransmission priority notified by the multicast transmitter 101 is A first, B second, and C last, the exact resource allocations for the retransmissions may be: A retransmits packet 3 with CQI value e4, C retransmits packet 2 with CQI value e4, and C retransmits packet 4 with CQI value e5.

In another scenario, e4=e5=e6. Such scenario may occur for example when A, B and C are close to each other. In that case, link quality does not make any difference in selection of the retransmitter of a certain packet. Instead, retransmission priority can be used as a selection criteria. If the retransmission priority notified by the multicast transmitter 101 is A first, B second, and C last, packet 2 will be sent by B, packet 3 will be sent by A, and packet 4 will be sent by C. Hence, the exact resource allocations for the retransmissions are: A retransmits packet 3, B retransmits packet 2, and C retransmits packet 4. In this case, all the retransmission use the same CQI value because e4=e5=e6.

Figure 2:
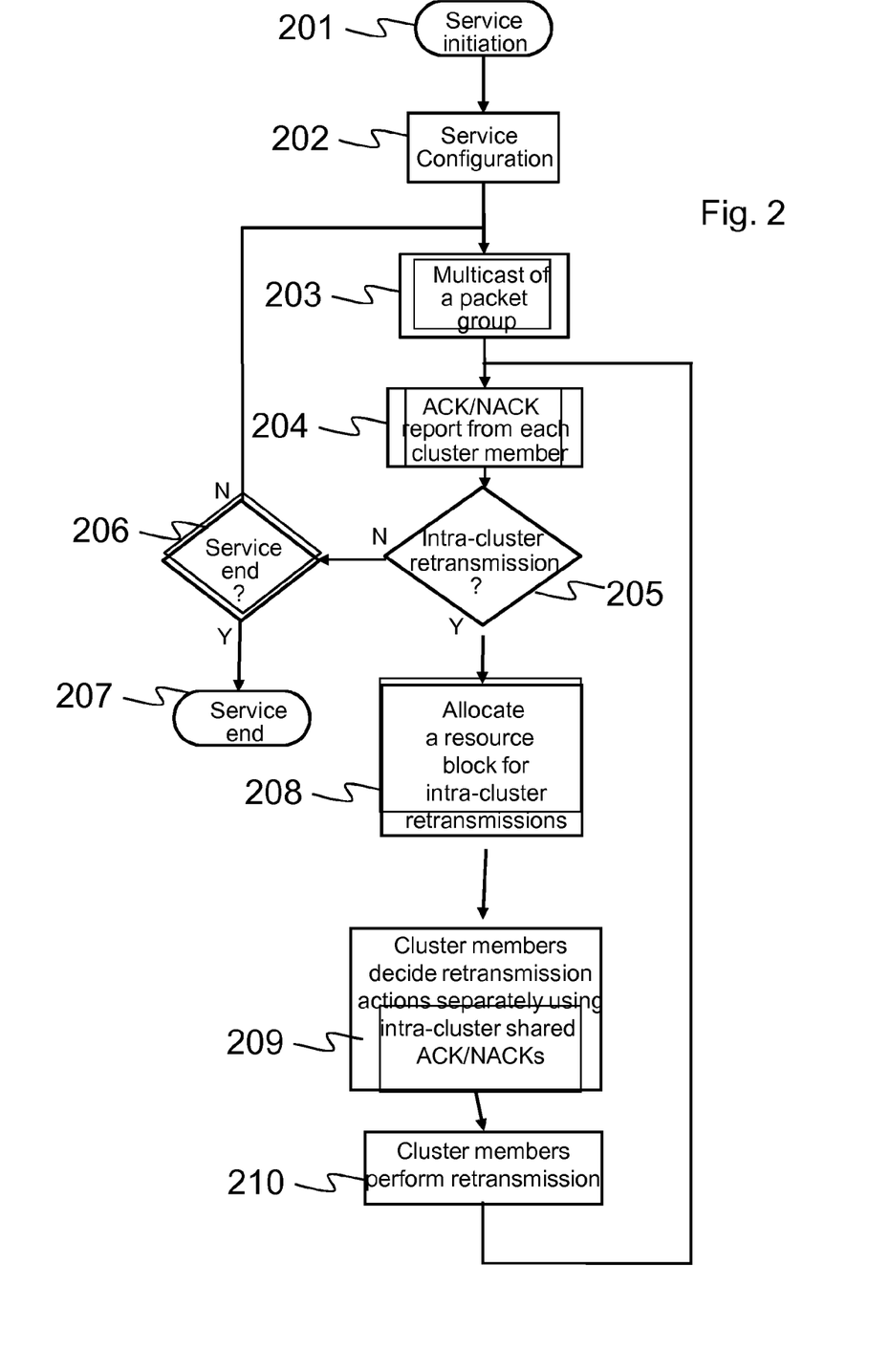
FIG. 2 shows a flow chart according to certain embodiments.

FIG. 2 shows a flow chart according to certain embodiments.

Multicast service is initiated in phase 201, and the service is configured in phase 202. Service configuration may include for example defining retransmission priority for the recipients of the multicast service and notifying the retransmission priorities to the recipients. Service configuration may include also configuration of multicast group size defining number of packets in a group of multicast packets. At least one retransmission resource block may also be defined in this phase. Receivers may be furnished with information enabling them to receive ACK/NACK information sent by other members of the cluster. This information may be comprised in acknowledgement feedback information defining acknowledgement feedback resources, which may comprise frequencies, spreading codes, timing schema and the like needed to transmit and receive acknowledgements.

Multicasting of a group of packets is performed in phase 203 and ACK/NACK reports for the multicast packets are received at the multicast transmitter from each member of a cluster of recipients (the recipients of the multicast transmission) in phase 204. Then it is checked if intra-cluster retransmission is needed in phase 205. Intra-cluster retransmission is not needed e.g. if all packets have been positively acknowledged by all recipients. Another option when intra-cluster retransmission is not used or not even available, is the case where all recipients have negatively acknowledged certain packet. In such case none of the cluster members can retransmit and thereby the retransmission needs to be performed by the original sender of the multicast packet.

If intra-cluster retransmission is not needed, it is checked if the service has ended in phase 206. If the service has ended, the procedure stops in phase 207. If the service has not ended, the procedure returns from phase 206 to phase 203 to send more packets.

Transmitting ACK/NACK information from the cluster comprises two distinct phases, NACK phase and ACK phase.

In the NACK phase, receivers having failed to correctly receive or decode the transmitted information transmit NACK toward the multicast transmitter. In this phase, receivers having correctly received the information listen for NACKs sent by receivers that have failed to correctly receive or decode the transmitted information and store any NACKs received in this phase.

In the ACK phase, receivers having received the multicasted information correctly may transmit ACKs toward the multicast transmitter. In this phase, the NACK receivers listen to ACKs to determine which receivers received the multicasted information correctly. After both phases, receivers will be in possession of collective information received by listening to ACK/NACK transmissions toward the multicast transmitter. The ACK phase may precede the NACK phase, or vice versa. In some embodiments, explicit ACKs may be omitted and lack of NACK from any particular receiver is interpreted as an ACK.

Using this two-phase process, receivers will obtain collective information on receiving statuses directly from other receivers by listening to transmissions the other receivers send toward the eNB.

If it is concluded in phase 205 that intra-cluster retransmission is to be initiated, then, in phase 208, a resource block is allocated for the intra-cluster retransmissions and the cluster members are informed of the resource block. Then in phase 209, the cluster members decide on required retransmission actions separately from each other. The cluster members may use the same criteria for deciding on the retransmissions whereby they end up to the same conclusion. The decision may be based on one or more of the following: the resource block, packet size, retransmission priority of each cluster member, quality of links between the cluster members, power conditions of cluster members, and the collective ACK/NACK information. In phase 210, the cluster members then perform the retransmission actions they decided upon. After this the procedure returns to phase 204 and the recipients send ACK/NACK reports for the retransmitted packets. Phase 208 may alternatively be performed earlier, for example in conjunction with service configuration at phase 202. In that embodiment, the size of the resource block may not be entirely configurable. In some embodiments, a block is allocated in phase 202, for example, and sub-blocks configured therefrom in phase 208, for example.

It should be noted, that for the method to work all receivers do not always need to successfully receive all of the collective information. It may be sufficient that one ACK receiver receives one NACK, which triggers intra-cluster retransmission which may be successfully received by all NACK receivers.

Figure 3:
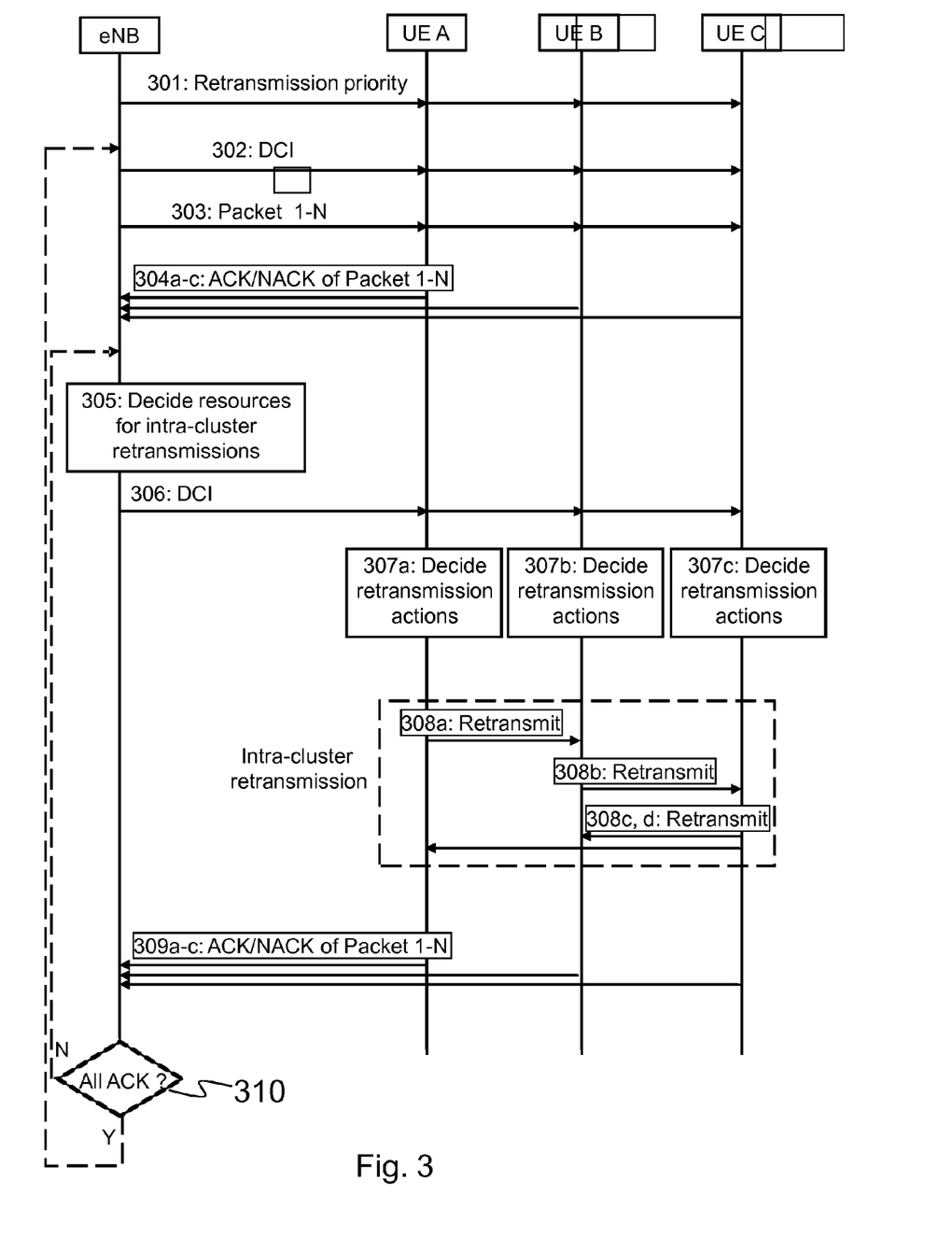
FIG. 3 shows a procedure example according to certain embodiments.

FIG. 3 shows a procedure example according to certain embodiments.

Before initiating multicast transmission the multicast transmitter, in this example an eNB according to LTE, informs multicast recipients UE A, UE B and UE C, retransmission priority 301, i.e. priority order of the recipients for performing retransmissions.

Figure 4:
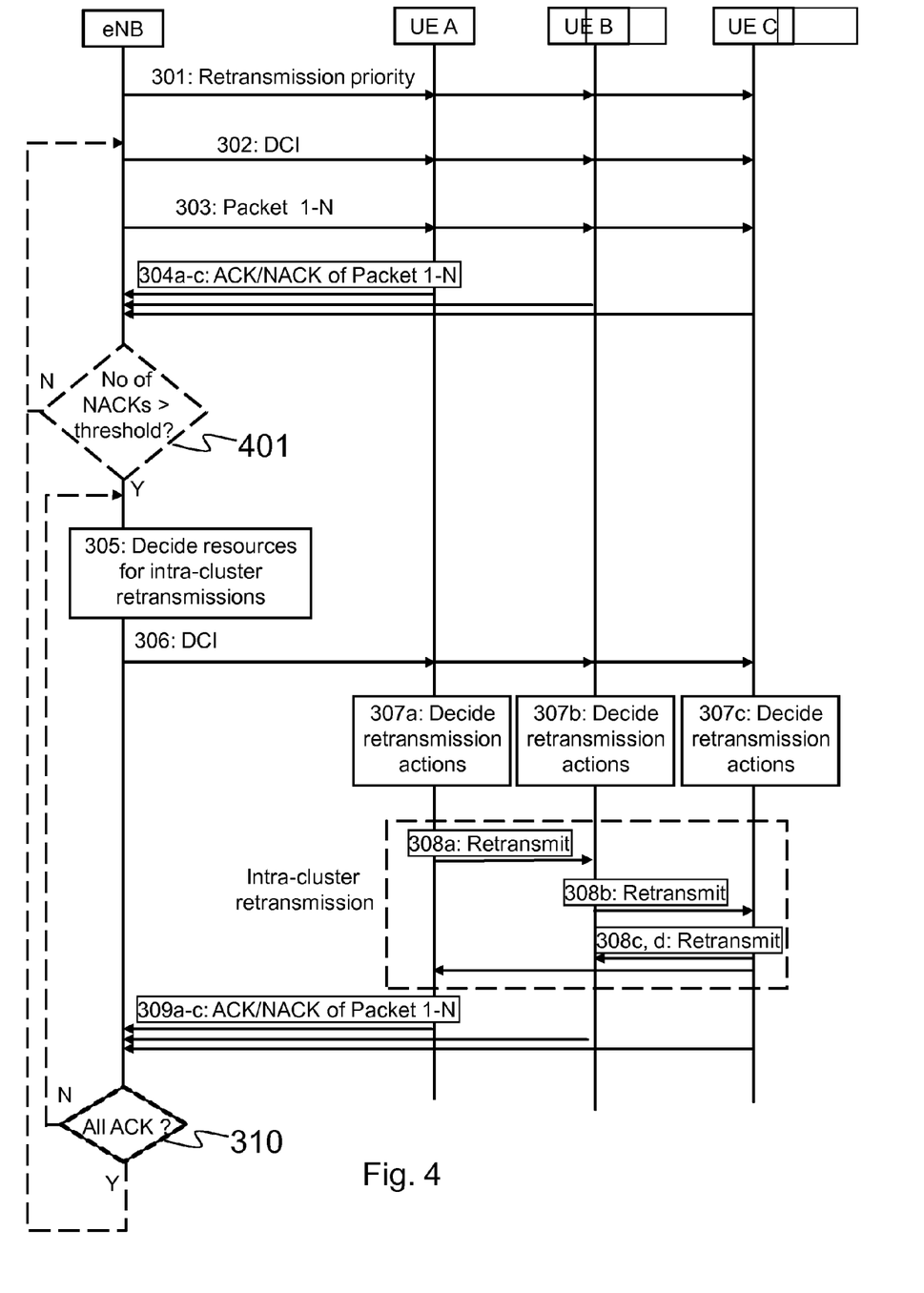
FIG. 4 shows another procedure example according to certain embodiments.

In the procedure shown in this example intra-cluster retransmission is performed periodically after multicasting a group of packets. The number of packets in each multicast group of packets can be preconfigured by eNB e.g. at the same time when retransmission priority of each cluster member is notified, and kept constant during the multicast service. FIG. 4 shows an alternative in which the number of packets in the multicast group is dynamically defined.

To initiate multicast transmission eNB sends DCI 302 informing recipients transmission details of the multicast transmission. After this the eNB sends 1-N multicast packets 303. The recipients reply with ACK/NACK messages 304a-304c for the packets. The ACK/NACK messages may be conveyed from the recipients to the eNB via a shared channel or via dedicated channels. The ACK/NACK information is transmitted in two phases, ACK phase and NACK phase, as described above in connection with FIG. 2. Also as described above, recipients UE A, UE B and UE C listen to each other's ACK/NACK transmissions to compile collective ACK/NACK information.

After receiving the ACK/NACK messages the eNB allocates an overall resource for the intra-cluster retransmissions, phase 305. That is, the eNB allocates certain amount of transmission resources to the retransmissions without specifying exactly how the retransmissions shall occur. The eNB sends to the recipients UE A, UE B and UE C DCI informing this overall resource allocation. In this example the cluster of recipients is formed by the recipients UE A, UE B and UE C.

Each recipient UE A, UE B and UE C then decides separately on retransmission actions that need to be taken within the cluster, 307a-307c. The decisions may be based on collective ACK/NACK information received from other members of the cluster and the retransmission resources defined by the multicast transmitter. After that the members of the cluster of recipients perform the retransmissions 308a-308d.

In response to the retransmissions, the recipients may again reply to the eNB with ACK/NACK messages 309a-c for the retransmitted packets.

After receiving ACK/NACK messages for the retransmissions from the recipients, the eNB checks in phase 310, whether all originally transmitted packets have been positively acknowledged. If all packets have been positively acknowledged, eNB continues to send more multicast packets. That is, the procedure returns to send DCI 302 for the next group of multicast packets. If some of the packets have been negatively acknowledged, the process returns to phase 305 and intra-cluster retransmission is initiated again.

In this example the messages 301, 302 and 306 are broadcasted to the recipients. FIG. 4 shows a procedure example according to some embodiments. The example is a variant of the example shown in FIG. 3. Now retransmission is triggered only when the total number of received NACKs (or the number of NACKed packets) is exceeds a threshold.

After receiving ACK/NACK messages 304a-304c for the original multicast transmission, the eNB checks in phase 401, whether the number of NACKs exceeds a predefined threshold. If the threshold is not exceeded, eNB continues to send more multicast packets. That is, the procedure returns to send DCI 302 for the next group of multicast packets. If the threshold is exceeded, intra-cluster retransmission is initiated the same way as in FIG. 3.

In order for the recipients to know, which packets the ACK/NACK table is concerned with, in this example the signalling 306 relating to initiating intra-cluster transmission includes an indication of a packet index. For this purpose the eNB stores packet index with the associated ACK/NACK statuses. It is observed that it suffices to store the packet index and the ACK/NACK status for the packets not received correctly by all cluster members. It is not mandatory to store these for the packets that are correctly received by all cluster members.

For the purpose of certain example aspects and embodiments, it is observed that if none of the recipients of a multicast packet receive the packet without errors, i.e. if all recipients report NACK for a certain packet, such packet is retransmitted by the original multicast transmitter. Clearly if none of the member of the cluster received the packet, none of the members can retransmit it.

An advantage that is obtained by gathering collective ACK/NACK information of receiving statuses from listening to ACK/NACKs sent by other receivers, is that many intra-cluster retransmissions can be defined at the same time, hence leading to lower signaling overhead compared to defining retransmissions individually. Also a separate phase of informing the ACK/NACK information from the multicast transmitter is obviated since the receivers obtain the information according to the two-phase ACK/NACK transmission procedure. Spectrum efficiency therefore becomes higher as the link quality between the intra-cluster receivers may be much better than that of between eNB and receiver.

Embodiments of the present invention may be implemented in software, hardware, application logic or a combination of software, hardware and/or application logic. The software, application logic and/or hardware may reside on multicast transmitter (such as an eNB 101 of FIG. 1A) or on a wireless communication device (such as UEs A-C of FIG. 1A).

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5 below. The computer-readable medium may be a digital data storage such as a data disc or diskette, optical storage, magnetic storage, holographic storage, phase-change storage (PCM) or opto-magnetic storage. The computer-readable medium may be formed into a device without other substantial functions than storing memory or it may be formed as part of a device with other functions, including but not limited to a memory of a computer, a chip set, and a sub assembly of an electronic device.

Figure 5:
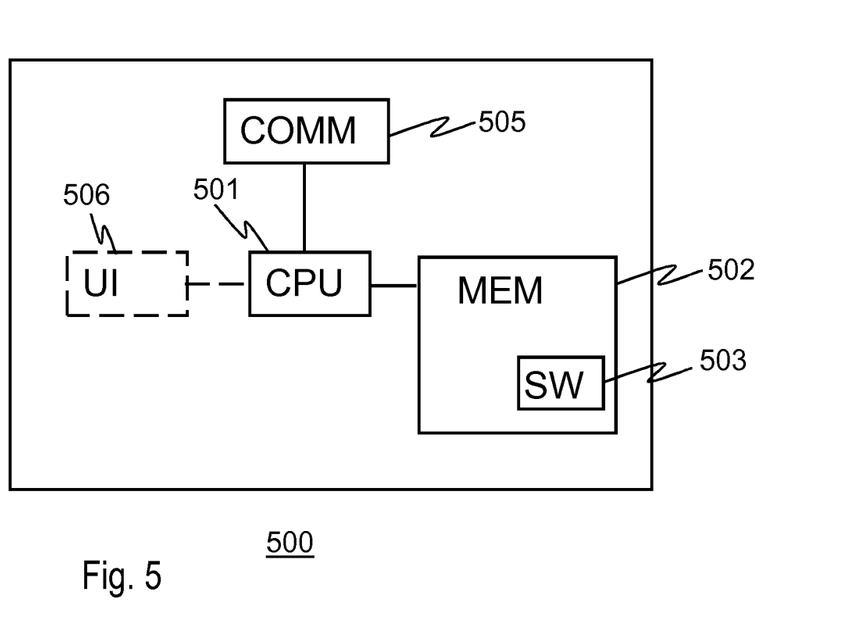
FIG. 5 shows an example block diagram of an apparatus according to certain embodiments.

FIG. 5 shows an example block diagram of an apparatus 500 according to certain example embodiments of the invention. The apparatus 500 is suitable for functioning as any of the apparatuses A-C or the apparatus 101. It may be a wired apparatus or a handheld wireless apparatus.

The apparatus 500 is a physically tangible object and comprises at least one memory 502 configured to store computer program code (or software) 503. The apparatus 500 further comprises at least one processor 501 configured to control the operation of the apparatus 500 using the computer program code 503, and a communication unit 505 configured to communicate with other entities or apparatuses. Additionally, the apparatus may comprise a user interface 506 (shown with dashed line). The user interface typically includes a display and keyboard or keypad for user interaction. It is not mandatory to have the user interface. Instead, controlling of the apparatus may be effected by means of a remote connection through the communication unit 505. The at least one processor 501 may be a master control unit, MCU. Alternatively, the at least one processor 501 may be a microprocessor, a digital signal processor, DSP, an application specific integrated circuit, ASIC, a field programmable gate array, a microcontroller or a combination of such elements. FIG. 5 shows one processor 501, but the apparatus 500 may comprise a plurality of processors 501.

The communication unit 505 may be, e.g., a radio interface module, such as a wireless local area network, WLAN, Bluetooth, global system for mobile communication, GSM, general packet radio service, GPRS, code division multiple access, CDMA, wideband code division multiple access, WCDMA, or long term evolution, LTE radio module. The communication unit 505 may be integrated into the apparatus 500 or into an adapter, card or the like that may be inserted into a suitable slot or port of the apparatus 500. The communication unit 505 may support one radio interface technology or a plurality of technologies. FIG. 5 shows one communication unit 505, but the apparatus 500 may comprise a plurality of communication units 505.

A skilled person appreciates that in addition to the elements shown in FIG. 5, the apparatus 500 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 500 may comprise a disposable or rechargeable battery (not shown) for powering the apparatus 500 when external power if external power supply is not available.

As to the operations of the embodiments of the invention, when the computer program code 503 is executed by the at least one processor 501, this causes the apparatus 500 to implement operations of a multicast transmitter or operations of a multicast recipient and retransmission actions performed by a multicast recipient. In detail, the processor 501 and program code, or computer program, 503, may initiate actions of the apparatus 500. For example, sending data to another entity may be initiated.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention. It is also noted that the above embodiments are used merely to explain selected aspects or steps that may be utilized in implementations of the present invention. Some features may be presented only with reference to certain example embodiments of the invention. It should be appreciated that corresponding features may apply to other embodiments as well.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method comprising:
   obtaining, by a user equipment, information defining acknowledgement feedback resources for a cluster;
   receiving, by the user equipment, a multicasted packet from a multicast transmitter;
   determining, by the user equipment, reception status for the packet;
   responsive to the reception status being positive, transmitting, by the user equipment, in a positive acknowledgement phase of a cluster, a positive acknowledgement to the multicast transmitter and listening, by the user equipment, to negative acknowledgements directly from cluster members, in a negative acknowledgement phase of the cluster;

responsive to the reception status being negative, transmitting, by the user equipment, in a negative acknowledgement phase of the cluster, a negative acknowledgement to the multicast transmitter and listening, by the user equipment, to positive acknowledgements directly from cluster members, in a positive acknowledgement phase of the cluster; and determining, by the user equipment, whether to perform an intra-cluster retransmission of the received packet based on the listened to acknowledgement information transmitted by the cluster members.

2. The method of claim 1, wherein the positive acknowledgement or negative acknowledgement comprises an indication concerning a transmission power used.

3. The method of claim 1, wherein the determining whether to perform the intra-cluster retransmission is done at least in part responsive to a message from the multicast transmitter.

4. The method of claim 1, wherein the determining whether to perform the intra-cluster retransmission is done at least in part responsive to a number of negative acknowledgements obtained during the negative acknowledgement phase of the cluster.

5. The method of claim 1, wherein the determining whether to perform the intra-cluster retransmission is done at least in part responsive to at least one power condition in the cluster.

6. The method of claim 5, wherein the at least one power condition is obtained from acknowledgements received from cluster members.

7. An apparatus comprising:
at least one processor; and
at least one memory including computer program code;
the at least one memory and the computer program code configured to, with the at least one processor, cause the apparatus to:
obtain, by a user equipment, information defining acknowledgement feedback resources for a cluster;
receive, by the user equipment, a multicasted packet from a multicast transmitter;
determine, by the user equipment, reception status for the packet;
responsive to the reception status being positive, transmit, by the user equipment, in a positive acknowledgement phase of a cluster, a positive acknowledgement to the multicast transmitter and listen, by the user equipment, to negative acknowledgements directly from cluster members, in a negative acknowledgement phase of the cluster;
responsive to the reception status being negative, transmit, by the user equipment, in a negative acknowledgement phase of the cluster, a negative acknowledgement to the multicast transmitter and listen, by the user equipment, to positive acknowledgements directly from cluster members, in a positive acknowledgement phase of the cluster; and
determine, by the user equipment, whether to perform an intra-cluster retransmission of the received packet based on the listened to acknowledgement information transmitted by the cluster members.

8. The apparatus of claim 7, wherein the positive acknowledgement or negative acknowledgement comprises an indication concerning a transmission power used.

9. The apparatus of claim 7, wherein the determining whether to perform the intra-cluster retransmission is done at least in part responsive to a message from the multicast transmitter.

10. The apparatus of claim 8, wherein the determining whether to perform the intra-cluster retransmission is done at least in part responsive to a number of negative acknowledgements obtained during the negative acknowledgement phase of the cluster.

11. The apparatus of claim 8, wherein the determining whether to perform the intra-cluster retransmission is done at least in part responsive to at least one power condition in the cluster.

12. The apparatus of claim 11, wherein the at least one power condition is obtained from acknowledgements received from cluster members.

13. A non-transitory computer-readable storage medium including computer program code which, when executed by at least one processor causes operations comprising:
obtaining, by a user equipment, information defining acknowledgement feedback resources for a cluster;
receiving, by the user equipment, a multicasted packet from a multicast transmitter;
determining, by the user equipment, reception status for the packet;
responsive to the reception status being positive, transmitting, by the user equipment, in a positive acknowledgement phase of a cluster, a positive acknowledgement to the multicast transmitter and listening, by the user equipment, to negative acknowledgements directly from cluster members, in a negative acknowledgement phase of the cluster;
responsive to the reception status being negative, transmitting, by the user equipment, in a negative acknowledgement phase of the cluster, a negative acknowledgement to the multicast transmitter and listening, by the user equipment, to positive acknowledgements directly from cluster members, in a positive acknowledgement phase of the cluster; and
determining, by the user equipment, whether to perform an intra-cluster retransmission of the received packet based on the listened to acknowledgement information transmitted by the cluster members.

14. The method of claim 1, wherein the listened to acknowledgement information is a retransmission priority of each user equipment.

15. The method of claim 1, wherein the listened to acknowledgement information includes at least one of: a resource block, a packet size, a retransmission priority of each user equipment, a quality of links between the user equipment, or a power condition of the user equipment.

* * * * *